United States Patent

Reimer

[15] 3,698,189

[45] Oct. 17, 1972

[54] NEUTRAL CONTROL FOR HYDRAULIC TRANSMISSION

[72] Inventor: Leonard H. Reimer, Hutchinson, Kans.

[73] Assignee: The Cessna Aircraft Company, Wichita, Kans.

[22] Filed: April 9, 1971

[21] Appl. No.: 132,797

[52] U.S. Cl. ..................................................60/53 A
[51] Int. Cl. .............................................F16h 39/10
[58] Field of Search ......................................60/53 A

[56] References Cited

UNITED STATES PATENTS 3,131,540  5/1964  Ritter..........................60/53 A
3,175,365  3/1965  Allgaier et al. ............60/53 A
3,313,108  4/1967  Allgaier et al. ............60/53 A Primary Examiner—Edgar W. Geoghegan
Attorney—Gregory J. Nelson, James W. McFarland and Miller & Brown

[57] ABSTRACT

A neutral hydraulic clutching valve incorporated within the valve disc of a hydromechanical transmission. An actuating stem on the valve poppet extends outwardly of the valve disc to be actuated by a cam surface on the transmission control sleeve upon movement of the control sleeve to the neutral position. A neutral valve intercepts each valve slot of the closed loop and relieves pressure therein when actuated.

12 Claims, 5 Drawing Figures

INVENTOR
LEONARD H. REIMER
ATTORNEY

INVENTOR
LEONARD H. REIMER
*Gregory J. Nelson*
ATTORNEY 3,698,189

NEUTRAL CONTROL FOR HYDRAULIC TRANSMISSION

BACKGROUND OF THE INVENTION

This invention relates to hydraulic transmissions and relates more particularly to hydraulic neutral clutching means for such devices.

Transmissions of the type referred to include hydraulic pump and motor means adjacently mounted at opposite sides of a rotating valve plate or disc. The valve disc has a pair of through slots carrying high and low pressure motive fluid back and forth to the pump and motor. The pump and motor swash plates rotate synchronously with the valve disc, and an external sleeve is manually movable to vary the inclination of the pump and/or motor swash plates. The pump and motor each carry axial pistons engaging the swash plates, and neutral no-power condition is selected by positioning the pump swash plate at right angle to the pump pistons.

The precision required to position the pump swash plate creates a serious problem in mass production manufacture of economical units. A slight variation away from the right angle position, even a quarter of a degree, creates a small pump displacement resulting in a slow but powerful output shaft rotation. It will be appreciated that such exacting requirement is highly expensive or unfeasible to mass production. Previous solutions contemplate use of a mechanical clutch in the drive train that is actuated when neutral is selected to completely interrupt power transmittal.

SUMMARY OF THE INVENTION

The invention contemplates hydraulic clutching means incorporated within the rotating valve disc which are actuated by the swash plate control member upon selecting the neutral position. The clutching means when actuated prevent pressure build-up in either of the valve slots to effectively interrupt power transmittal.

More particularly, the invention includes a fluid check valve at each valve slot controlling flow from the valve slot to a low pressure exhaust area. Each check valve has an actuating pin extending outside the valve disc. The swash plate controlling member has a cam surface engaging and depressing the actuating pins as the neutral position is selected; the neutral valves thereupon exhaust sufficient fluid from the valve slots to relieve pressure. The preferred embodiment also incorporates the charging check valves with the neutral valves.

Accordingly, it is a broad object of the invention to provide improved neutral control means for hydromechanical transmissions.

A more particular object is to provide pressure relieving check valves within the rotating valve disc of a hydrostatic transmission and means actuating same at the neutral position.

A further objective is to incorporate the actuating means in the cam positioning control member of the transmission.

Yet another purpose in accordance with the preceding objectives is to provide hydraulic clutching valves compact and simple in design.

Another object of the invention is to provide a hydraulic clutch control of smooth and reliable operation.

These and other objectives and advantages of the present invention are expressly set forth or will become apparent from the following detailed description and accompanying drawings of the preferred embodiment.

DETAILED DESCRIPTION OF THE PREFERRED EMBODIMENT

Figure 1:
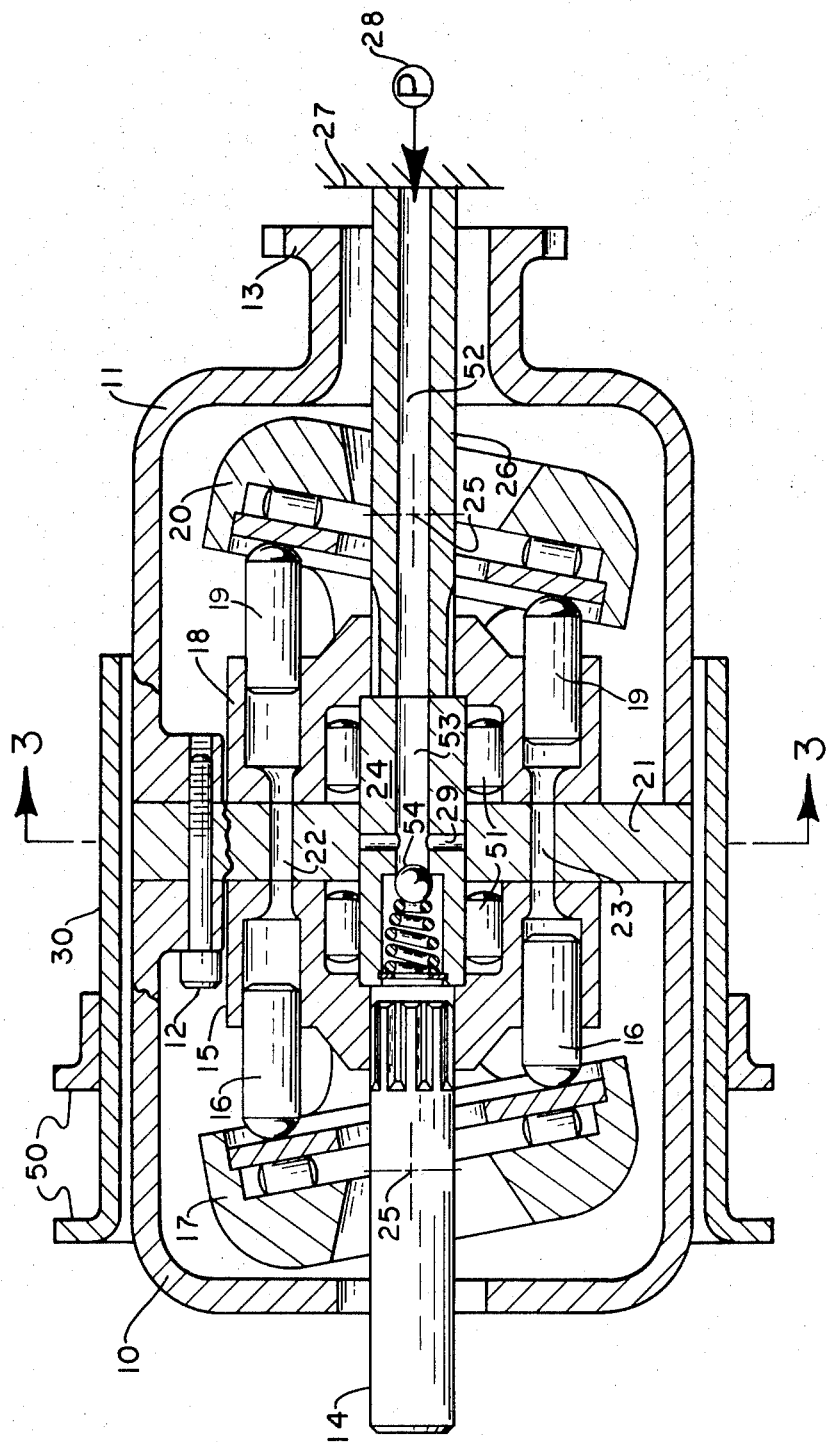
FIG. 1 is a transverse section of the hydromechanical transmission.

FIG. 1 illustrates the overall hydromechanical unit showing the rotating housings 10, 11 secured together by bolts 12. The power output shaft 13 is integrally formed with the housing 11 so that the entire housing rotates at output speed. The rotating power input shaft 14, driven by an engine, not shown, extends through housing 10 to interconnect and drive the cylinder barrel 15 of the pump unit. Pistons 16 reciprocal in axial bores of the cylinder barrel protrude outwardly to contact tiltable pump cam body 17. The axial bores communicate with a flat surface of the barrel rotating against one side of a valve plate or disc 21. Bolts 12 secure valve disc 21 to rotate at output speed with the housings. Motor cylinder barrel 18, identical to pump barrel 15, abuts the other face of valve disc 21 and is provided with axial bores communicating with the valve disc. Motor pistons 19 drivingly contact the motor cam body 20. Barrel 18 and its pistons 19 do not rotate but are held stationary by the shaft 26 affixed to a non-rotating exterior support schematically represented at 27. A central shaft 24, secured to rotate with valve disc 21, carries bearings 51 for support of both the rotating and non-rotating cylinder barrels 15 and 18.

Figure 2:
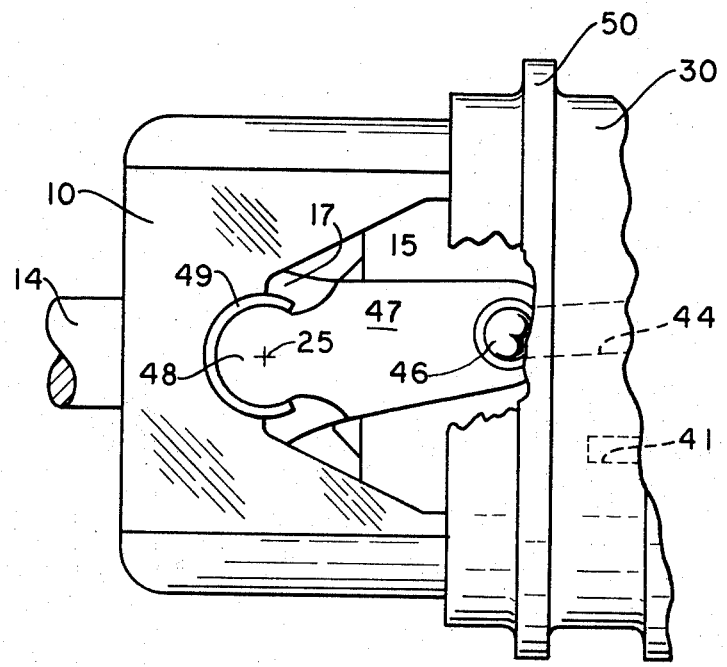
FIG. 2 is a fragmentary exterior view of the unit showing a cam pivoting arm 47.
Figure 5:
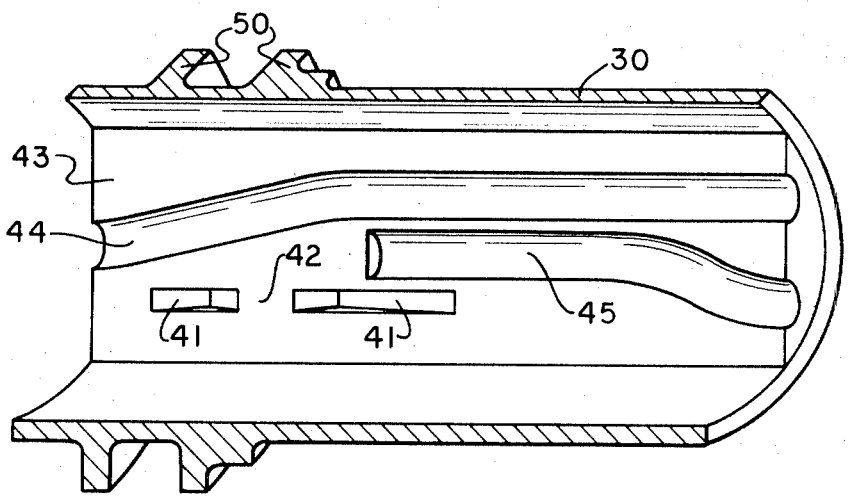
FIG. 5 is an isometric perspective view of the control sleeve viewed generally along line 5—5 of FIG. 3.

The purpose of housings 10, 11 is to inter-secure the cam bodies 17 and 20 and valve disc to output shaft 13. The cam bodies rotate with the housings and valve disc, yet tilt about axes 25 to vary their inclinations and change the stroke length of pistons 16 and 19. Each cam body has a pair of control arms 47, one is shown in FIG. 2, extending inwardly toward the center of the unit on opposite sides of the cylinder barrels. A cylindrical trunnion 48 at one end of arm 47 is rockable within the C-shaped bearing insert 49 on housing 10, insert 49 also securing cam 17 to rotate with housing 10. At the other end of arm 47 is a swiveling ball joint 46 contained within arm 47 and protruding outwardly into a groove speed on the inside of cylindrical control sleeve 30. Motor cam body 20 is similarly constructed with ball joints fitting in another groove 45, FIG. 5, in sleeve 30. The cam bodies drive control sleeve 30 through ball joints 46, and sleeve 30 rotates in unison with housing 10 and output speed group. Sleeve 30 has spaced external flanges 50 as seen in both FIGS. 1 and 2, between which fits a manually operated yoke that slides the control sleeve axially. Following within the control groove track 44, cam 17 varies in inclination in a preselected manner. The motor cam acts similarly upon axial movement of the control sleeve within control track 41.

Figure 3:
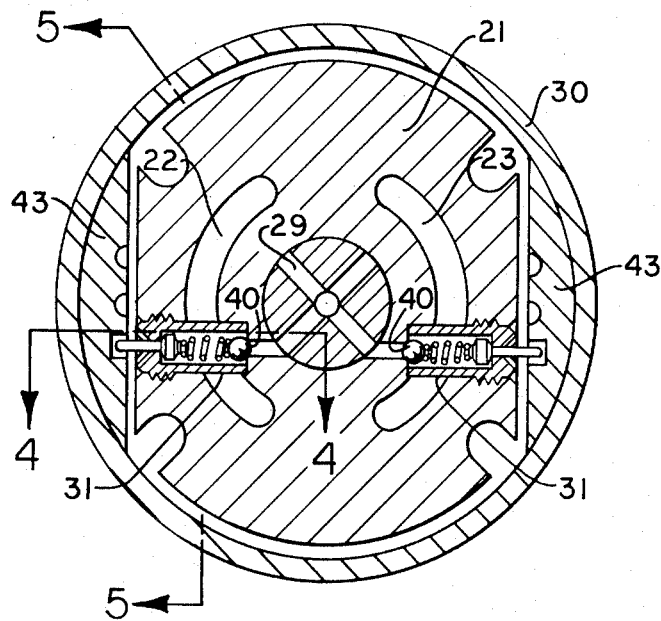
FIG. 3 is a section taken along line 3—3 of FIG. 1.

The central valve disc has a pair of arcuate through slots 22 and 23, FIG. 3, one of which receives pressure fluid displaced from the pump piston bores and delivers same to the motor bores then communicating with that slot. The other slot carries fluid displaced from the motor to the pump, interconnecting the retracting motor pistons 19 with those pump pistons 16 which are moving outwardly. This circuitry, characterized by continual recirculation of the motive fluid, is commonly referred to as a closed loop system.

A fixed displacement, relatively low pressure charging pump 28, illustrated schematically in FIG. 1, delivers lubricating, cooling and make-up fluid flow to the unit. The charging flow enters through communicating central bore 52 and 53 in the stationary and central shafts 26 and 24. The charge pressure opens ball check valve 54 and lubricating fluid passes through the interior of the housings. Charging fluid also flows through cross-drilled holes 29 in the central shaft to the lower pressure side of the closed loop by opening one of check valves 40. The high pressure side, for instance slot 22, holds the associated check 40 closed, while the charging pressure opens the other check to flow into slot 23. This makes up for leakage losses from the closed loop so as to hold a positive pressure in and maintain the closed loop filled at all times.

In general operation, the input shaft 14 rotates cylinder barrel 15 which delivers pressure fluid to the stationary motor barrel 18. Pistons 19 are forced outwardly causing motor cam 20 and the entire output speed group to rotate. If the angle of inclination of motor cam 20 exceeds that of the pump cam, the output shaft runs at a slower speed than the input. As the pump and motor cam inclinations become more equal, output speed increases to one-half input speed when the cams are equal. A portion of the power is transmitted mechanically by the reaction of the pump pistons 16 against the rotating pump cam 17. At one-to-one ratio, equal input and output speeds, all torque transmits mechanically in this manner at which time the motor cam is perpendicular to the shaft axis. Overdrive occurs when the motor cam is rotated counterclockwise to a position beyond a plane perpendicular to the shaft axis. Reversal of the pump cam to a position beyond a plane perpendicular to the shaft axis will reverse the direction of output rotation. Neutral, no power position is selected upon locating the cam with its face perpendicular to pistons 16 where the pump displaces no fluid. The general construction and operation of the unit so far described is known to the art and reference may be made to U. S. Pat. No. 3,313,108 for a more detailed description of the overall unit though not necessary to the understanding of the present invention.

Figure 4:
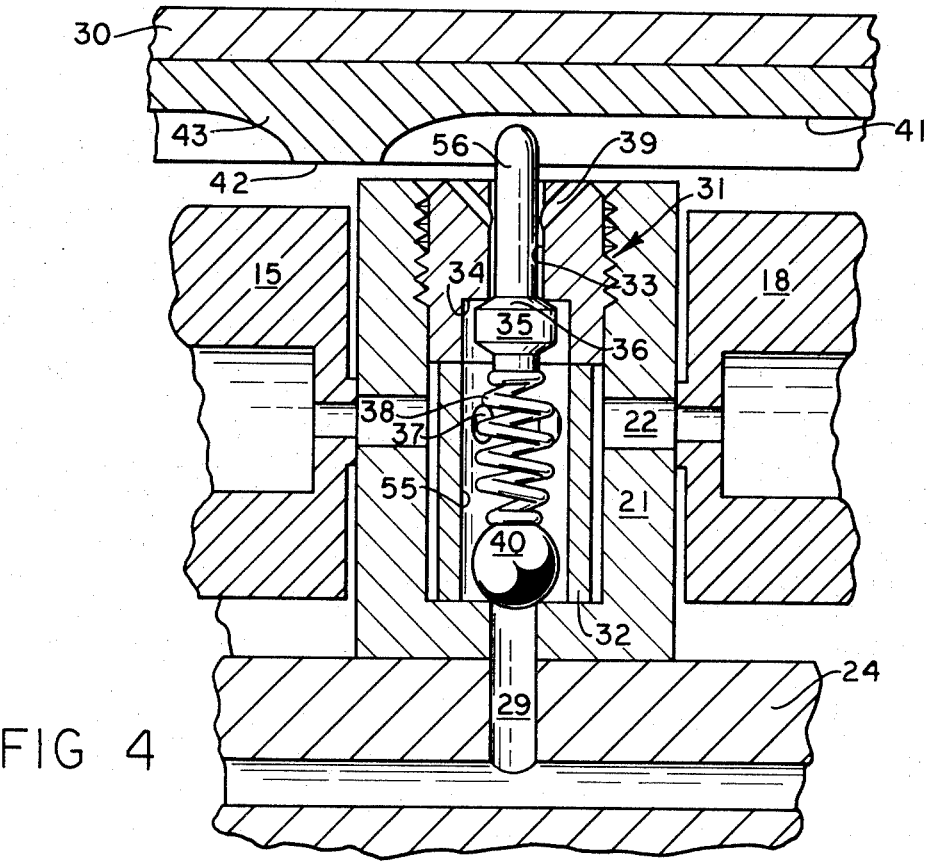
FIG. 4 is a fragmentary section taken along line 4—4 of FIG. 3 showing the neutral valve 31 in an enlarged scale.

The present invention relates to the neutral clutching valves 31 shown in FIGS. 3 and 4, and the means contained on the control sleeve for actuating the neutral valve. Valve 31 has a hollowed two-piece housing 32 threadably secured and received within valve disc 21 so as to intercept arcuate slot 22. Crossholes 37 in he casing 32 communicate its interior cavity 55 with slot 22.

Positioned at opposite ends of cavity 55 are the neutral poppet 35 and ball charging check valve 40. Compressed spring 38 urges poppet chamfer face 36 into engagement with casing shoulder 34 to seal cavity 55 from exhaust passages 39 and oppositely urges poppet 40 to seal bore 29 from cavity 55 and slot 22. Stem 56 of poppet 35 extends through bore 33 to the exterior of the valve disc and fits within a groove 41 on the control sleeve 30. Passages 39 freely communicate with the low pressure interior of the housings.

Upon opening movement of poppet 35 away from shoulder 34, fluid from slot 22 exhausts through bore 33 to the exterior of the transmission. Similarly, the valve 31 on the other side of the unit exhausts slot 23 when opened. Normally, an outer housing, not shown, surrounds the transmission so that this exhausted fluid collects and ultimately returns to a low pressure reservoir. By so relieving pressure in slots 22 and 23, the clutching valves 31 interrupt the transmittal of power and disconnect the output shaft 13 from input shaft 14 to effect the free-wheeling neutral condition.

Sleeve 30 incorporated a neutral cam track 41 for operating poppet 35. The general configuration of sleeve 30, as best seen in FIG. 2, is that of a circular casing. At opposite sides, circle segment cam inserts 43 are welded to the interior of sleeve 30 with flat sides facing the adjacent flat sides of valve disc 21. The pump and motor cam tracks 44, 45 and neutral cam slot 41 are formed upon inserts 43 as FIG. 5 clearly depicts. As sleeve 30 slides axially along the housing and nears the transmission neutral position where the pump cam is perpendicular to the pistons, raised portion 42 of track 41 slides over poppet stem 56 in FIG. 4. The poppet 35 depresses opening communication of valve slot 22 with exhaust passages 39 through cavity 55 and bore 33.

The raised portion is sized in axial length to engage stem 56 when the pump cam is in the range of approximately one degree either side of its perpendicular location. This band has been found sufficiently wide to account for manufacturing tolerances to assure that all units from mass production contain a properly located neutral position. In the same instance, however, this plus-or-minus 1° band is sufficiently small that no jerkiness of operation occurs at the control sleeve moves away from neutral, the poppets 35 close and suddenly one full degree of cam angle and associated power is transmitted. The 1° cam angle generates little flow and little power. This small flow makes the present invention particularly adaptable and practical in use. A relatively small valve 31, capable of being contained in the valve disc, need release only small volumes of fluid through little holes 39 to relieve pressure from the closed loop. The entire volume of fluid in slot 22 and communicating piston bores 16 and 19 need not be relieved; valve 31 exhausts only a small fraction thereof to instantly reduce pressure and interrupt power.

As previously mentioned, the illustrated embodiment of the invention also incorporates the charging check valve 40 within the small valve 31, which are biased by the same spring 38 as the neutral poppet. Check 40 opens dependent upon the pressure differential between the valve slot 22 and charging inlet 29 so that, even while the neutral poppet is open, the charging check can open to maintain positive pressure and prevent cavitation in the closed loop by replacing leakage losses and that small volume relieved through passage 39. It will be apparent that the tension of spring 38 against check 40 when in its neutral, compressed position, must be less than that of the lubrication check 54. Otherwise, when in neutral, the charge flow would all pass over lubrication check 54 at a pressure too low to open charging check 40, and cavitation would occur in the valve slot.

It will be clear to those skilled in the art that the invention may be utilized in hydraulic transmissions having stationary valve plates. In such configurations, the valve plate and pump and motor swash plates do not rotate; the pump cylinder barrel is driven at input shaft speed, and the motor cylinder barrel rotates with the output shaft. Other forms of transmissions in which the invention is adaptable to use include those having a fixed displacement motor or those which have no reversible flow provisions. Thus, it is to be understood that the preferred embodiment described in detail in the foregoing specification is exemplary in nature and not limiting to the scope and spirit of the invention as set forth in the appended claims.

Having described my invention with sufficient clarity that those skilled in the art may make, use and practice same, I claim:

1. In a hydromechanical transmission having an axial piston pump and an axial piston motor hydraulically connected in driving relation to each other through a pair of valving slots in a valve plate interposed between said pump and motor, control means to vary the displacement of the pump, wherein the improvement comprises:

a neutral control valve positioned in said valve plate in a bore communicating one of said valve slots with a low pressure sump, said control valve including valve means having a first position blocking flow to said low pressure sump and a second position permitting flow to be exhausted from said slot to said sump, biasing means urging said valve member to said first flow blocking position, operating means for moving said valve means to said second position, and actuating means associated with said displacement control means whereby upon positioning said control means in a neutral position said actuating means urges said operator to move said valve means to said second flow exhausting position.

2. In a hydromechanical transmission having an axial piston pump cylinder barrel and axial piston motor cylinder arranged in driving relationship to one another, a valve disc interposed between the pump and motor having a pair of through valve slots communicating said pump and motor; reciprocable pistons in the pump and motor extending outwardly of the barrels in opposite directions to drivingly engage tiltable swash plates respectively associated with the pump and motor, means securing the valve disc and swash plates to rotate synchronously with the output shaft, and an axially slidable outer control sleeve member engaging said swash plates to vary inclination of the swash plates to vary the transmission output in a preselected manner; wherein the improvement comprises:

a pair of neutral control valves disposed in the valve disc within bores intersecting said valve slots, each of said valves comprising, a movable poppet member having a first position blocking flow from the valve slot to the exterior of the valve disc through said bore and a second position permitting flow from the valve slot to the exterior of the valve disc through said bore, a biasing member urging said poppet to the closed flow blocking position; and a stem on said poppet extending through said bore to the exterior of said valve disc;

actuating means on said control sleeve comprising a pair of grooves in said sleeve each accepting one of said extending stems, and cam means on said sleeve engaging said stems upon positioning the sleeve to the neutral position so as to urge said poppets to an open position permitting exhausting fluid and pressure from said valve slots.

3. The device of claim 2 further including charging means communicating each of the valve slots with a source of make-up flow and a one-way check valve in each of said neutral valves controlling flow of the charging fluid into the respective valve slot.

4. The device of claim 3 wherein said biasing member urges both said poppet and said charging check valve to their closed positions.

5. A hydromechanical transmission comprising:

first and second cylinder barrels supported upon a common central shaft, said barrels having axial bores arranged therein, said bores communicating through passages with adjacent and spaced apart respective faces of said first and second barrels;

a power input shaft at one end of the unit drivingly engaging the first cylinder barrel;

a stationary shaft at the other end of the unit engaging the second barrel to hold same stationary;

first and second tiltable swash plates at opposite ends of the unit;

pistons in said bores extending oppositely from said first and second barrels to drivingly engage said first and second swash plates respectively;

a valve plate between said barrel faces secured to said central shaft and having a pair of arcuate through slots adapted to carry fluid between said first and second barrel bores;

means securing said first and second swash plates and said valve disc for synchronous rotation, said means also forming the rotary power output;

a pair of neutral check valves in said valve disc controlling flow between the respective arcuate slot and a low pressure exhaust zone;

a biasing member urging each of said check valves to a closed flow blocking position;

a stem extending from each of said check valves adjacent said control member adapted to move the check valves to open positions to relieve pressure in said slots upon actuation; and a manual control member operatively engaging said swash plates for varying the displacement of the pump and motor in a predetermined manner to vary transmission output speed rotation, said control member having means associated therewith adapted to engage and depress said neutral valve stems when said control is moved to a zero output speed position thereby relieving and equalizing pressure in said arcuate slots.

6. The device of claim 5 wherein said swash plate and valve disc securing means comprises a housing surrounding said cylinder barrels and swash plates, said swash plates tiltably secured upon the housing.

7. The device of claim 6 wherein said control member is an axially slidable external sleeve surrounding said housing having cam grooves on its interior surface, said swash plates being provided with control arms which are received in said cam grooves, whereby movement of said sleeve will vary the swash plate inclinations.

8. The device of claim 5 further including an auxiliary pump delivering low pressure fluid through communicating conduits in said stationary shaft, said central shaft and said valve disc directing fluid to each of said arcuate slots.

9. The device of claim 8 further including check valves in said valve disc permitting one-way flow of charging fluid to said arcuate slots, said biasing members also urging said check valves to closed flow blocking positions.

10. The device of claim 9 wherein said neutral check valves each comprise a poppet movably disposed within a bore in said valve disc intercepting said arcuate slot, said poppet engaging a shoulder on said valve disc in the closed position to block flow from the arcuate slot through said bore to the exterior of said valve disc.

11. The device of claim 10 wherein said stem is integrally formed on said poppet extending through said bore to the control member.

12. The device of claim 11 wherein each of said charging check valves comprises a ball sealingly engaging a second shoulder aligned and opposing said poppet shoulder, said biasing member extending between said poppet and ball and urging same in opposite directions against the respective shoulders.

* * * * *